United States Patent [19]

Hormannsdorfer

[11] Patent Number: 5,542,324
[45] Date of Patent: Aug. 6, 1996

[54] FORM DRILLING OR TURNING DEVICE

[76] Inventor: Gerd Hormannsdorfer, Kastanienick, GA, Burgdorf, Germany, D 3167

[21] Appl. No.: 368,406

[22] Filed: Dec. 29, 1994

Related U.S. Application Data

[63] Continuation-in-part of Ser. No. 970,282, filed as PCT/DE91/009635 Dec. 11, 1991, abandoned.

[30] Foreign Application Priority Data

Dec. 11, 1990 [DE] Germany ............................ 40 39 489.1

[51] Int. Cl.⁶ .................................................. B23B 41/04
[52] U.S. Cl. ............................................................ 82/1.3
[58] Field of Search ........................... 82/1.2–1.5, 18, 82/19

[56] References Cited

U.S. PATENT DOCUMENTS

| | | | |
|---|---|---|---|
| 398,481 | 2/1889 | Whitney | 82/19 |
| 1,102,538 | 7/1914 | Mulligan | 82/19 |
| 1,270,144 | 6/1918 | Gallimore | 82/1.3 |
| 1,289,242 | 12/1918 | Otis | 82/1.3 |
| 1,356,571 | 10/1920 | Ungerman | 82/1.3 |
| 1,540,826 | 6/1925 | Watts | 82/1.3 |
| 1,956,740 | 5/1934 | Gress | 82/1.3 |
| 2,182,478 | 12/1939 | Jacobson | 82/1.3 |
| 2,487,994 | 11/1949 | Trevena | 82/19 |
| 2,814,217 | 11/1957 | O'Donnell | 82/19 |
| 3,813,969 | 6/1974 | Wheeler | 82/1.3 |

FOREIGN PATENT DOCUMENTS 1315143  6/1987  U.S.S.R. .................................. 82/1.3

*Primary Examiner*—Maurina T. Rachuba
*Assistant Examiner*—Kenneth J. Hansen
*Attorney, Agent, or Firm*—Dominik & Stein

[57] ABSTRACT

A special device for producing by machining a multiplicity of shaped bores or shaped external surfaces, such as squares, hexagons, ellipses, polygons. This is done by superimposing a forced radial motion, produced by purely rolling-action elements, on the rotational motion of a tool holder in such a way that the cutting edge of a tool inserted in the tool holder follows the required path as the tool holder rotates. The device enables shaped bores and external surfaces to be produced not only cleanly and to the required tolerances, but also very rapidly and simply. The form drilling and turning device can be used on normal drilling and machining machines and machining centers, as well as on turning machines and power tools.

10 Claims, 4 Drawing Sheets

FORM DRILLING OR TURNING DEVICE

RELATED APPLICATIONS

This application is a continuation-in-part of U.S. patent application Ser. No. 07/970,282 filed as PCT/DE91/00963, Dec. 11, 1991, now abandoned.

The invention relates to a form drilling or turning device consisting of a drive shaft, a fixed housing and a tool holder which is constructed to accommodate a tool having at least one cutting edge, the drive shaft and tool holder being mounted rotatably in the housing and connected in such a way that during operation a rotational force component is transmitted from the drive shaft onto the tool holder but the tool holder can simultaneously be deflected in the radial plane, this deflection being controllable for the purpose of contour production by means of control elements assigned to the housing and the tool holder. This device can be used for the production by machining of shaped bores or external contours of special shape, for example square, hexagonal, oval, elliptical or polygonal shapes.

Such shapes in bores or taps are used in engineering for the most varied applications and in very widely differing geometries. The socket hexagon in the heads of screws, for example, are generally known and widespread. Only metal-forming processes, such as cold-impact or hot-impact extrusion, for example, come into consideration for the mass production of such screws, because such processes achieve effectively usable surfaces in conjunction with the lowest costs per piece. Matters look otherwise when smaller numbers of pieces are required, or when the particular component does not permit such a metal-forming process. In general machine building, above all, there is the need for the most varied shaped bores or external contours on components to be produced by machining. Here, it is usual with reference to shaped bores to have recourse to broaching or shaping, and in some cases also to erosion machining or to form drilling by means of a template, while for the production of external contours consideration is usually given to production using milling techniques.

Generally speaking, the starting point in the broaching or shaping of shaped bores, and in floating-tool broaching, as well, is a more or less strongly fluted surface of the shaped bore. The dimensional stability of a bore produced in this way is moderate. Increased wear of the internal broach occurs in the case of materials of higher strength. In addition, with blind bores there is the disadvantage of the occurrence of rubbing chips that have rolled in.

The erosion machining of shaped bores leads to excellent results, even in hardened materials. However, the expenditure on time for this production is very high, so that this process is excluded for most cases on grounds of cost.

On the other hand, an apparatus for producing shaped bores by rotational machining is known, which essentially consists of a special drill which can be clamped in a machine spindle by means of a floating holder and which is guided during the drilling operation by means of a hardened template which is to be arranged above the workpiece and has the respective contour desired. The functioning of the above-mentioned device is, however, defective in that its application may only be very limited. A substantial disadvantage of the apparatus is the fact that for geometrical reasons alone the polygonal drill does not describe a unique path inside the template, so that the contour produced departs in a variable fashion from the contour of the template. Owing to the wobbling rotation of the external drill edges inside the template, the edges become rounded with time in such a way that when the end face of the drill is reground the internal dimensions of the bore to be produced become smaller and the drill wobbles around even more in the template. The drill, which is produced from HSS, is not only expensive to procure and difficult to regrind, but also has a decidedly unfavourable cutting edge geometry. It is not possible to mount exchangeable cutting tips. It is disadvantageous, furthermore, that before the start of drilling the templates must be mounted above the workpiece, and the drill cannot be inserted into the template until the spindle is stationary, with the result that this produces a decidedly complicated mode of procedure which, for example, cannot be carried out on an automatically operating machine.

There are at present a number of technical possibilities with reference to the production by machining of external contours, of which milling may well be the most obvious. However, it is known that by comparison with turning, milling proceeds from a lower metal-cutting rate per unit time. Special devices, for example so-called multi-edged milling devices, are also known here, which exhibit very good results on milling machines. Such multi-edged milling devices do not, however, permit the production of rounded contours such as ellipses or three-lobed shapes, for example, and also cannot be used on a CNC turning machine with powered tools.

A device for producing polygonal holes is disclosed in German Patent 819,610. This device has a cylindrical housing which is prevented by means, for example an arm mounted on it, from rotating about its vertical central axis. Mounted rotatably in this housing is a Morse taper which can be, for example, plugged into the drill chuck of a drilling machine. The Morse taper carries with it a faceplate body which has a radial slot for accommodating a workpiece holding bar, in which slot the holding bar can be radially displaced in addition to its rotational motion imparted by the Morse taper. Arranged in the baseplate body is a spring, the tension of which can be adjusted and which presses the workpiece holding bar radially outwards, so that the latter bears with an edge which is shaped like a blade in this region against a master template, which is arranged in the lower part of the housing and whose contour corresponds to the polygonal bore to be produced. If the Morse taper now rotates, the workpiece holding bar rotates in sympathy and is pressed by the spring against the rim of the master template. In this process, it slides to and fro in the radial slot in accordance with the rotation of the baseplate body. A workpiece clamped in the workpiece holding bar is intended in this way to bore a predrilled hole to form a polygonal hole corresponding to the contour of the master template.

The essential disadvantage of this device is that the success aimed for will occur only in a very defective fashion, if at all. The reasons for this are to be seen in the friction forces occurring between the blade-shaped edge of the workpiece holding bar and the master template, and in the large angular variations to be noted between the latter during a revolution. A perfect revolution of the tool is possible only given appropriately small friction forces between the workpiece holding bar and master template, that is to say the spring must be correspondingly weak or be adjusted to be weak. This leads, automatically to a wobbling revolution, the "vibration system" of the device builds up in the process and spring flutter occurs. A proper working process is therefore not possible. A perfect bore corresponding to the desired contour can be produced only if the blade-shaped edge of the workpiece holding bar bears firmly against the rims of the master template in all phases of the revolution. However, this is possible only in a correspondingly stronger, or more strongly adjusted spring. This results, however, in very high friction forces, which in conjunction with the angular variations and acceleration values to be noted, in particular in the corner regions of the templates, would lead to a seizure of the workpiece holding bar and to a destruction, possibly resulting therefrom, of parts of the device.

The above statements also hold analogously for devices which are similar in principle and were chiefly invented in the first half of our century but did not furnish the success desired if they were realised at all. For this reason, in form drilling recourse still continues to be had today to the template drilling method despite the indicated deficiencies.

The task therefore existed of providing a special device for the production of different shaped bores or different external contours for the cases where low and average numbers of pieces are required in conjunction with increased demands on the cleanliness of the surface and the dimensional stability of the contour without the disadvantages described above, such a device being required to operate in an exceptionally economical fashion.

This object is achieved by means of a form drilling or turning device which has a drive shaft, a fixed housing and a tool holder which is constructed to accommodate a tool having at least one cutting edge, the drive shaft and tool holder being mounted rotatably in the housing and connected to one another in such a way that during operation a rotational force component is transmitted from the drive shaft onto the tool holder but the tool holder can simultaneously be deflected in the radial plane, this deflection being controllable for the purpose of contour production by means of control elements assigned to the housing and the tool holder. According to the invention, the control elements consist of at least two cam discs which are firmly connected to the housing, arranged above one another and rotated with respect to one another by a specific angular amount in the direction of rotation, as well as rolling members which roll on these cam discs and are assigned to the tool holder, there being at least three contact points between the rolling members and the cam discs, and the loci of the cam discs describing an equidistant line, corresponding to half the diameter of the rolling members, of the distorted contour of the shaped bore or the external contour.

Thus, for the purpose of controlling the tool holder the invention has recourse to purely rolling-action elements, as a result of which the friction forces between these elements and the cam discs are in practice negligibly small. The interaction according to the invention of the rolling elements and cam discs represents a forced control by means of which a radial or pivoting motion is superimposed on the tool holder rotating in the housing.

An essential point of the invention is the realisation that radial deflections lying in a radial plane and superimposed on the rotational motion of a member can be produced particularly favourably in a positive (forced) fashion by means of purely rolling-action elements by arranging the control elements, consisting for example of a respectively external cam disc and internally running rolling members, stacked above one another at least twice in the axial direction and simultaneously rotated with respect to one another by a specific angular amount. A further point of emphasis of the invention is, however, the realisation that with increasing enlargement the loci required on such cam discs change increasingly away from the contour to be drilled or turned towards a circular shape.

These realisations are used with the invention in such a way that at least two cam discs which are offset in the axial direction and arranged rotated with respect to one another by a specific amount in the direction of rotation are proposed for the control unit of the device. The direction of action of the rolling members associated with the tool holder, which are offset axially with respect to one another in a synchronous fashion relative to the cam discs is tuned to the loci of the cam discs. Furthermore, an equidistant line, corresponding to half the diameter of the rolling members, of the enlarged contour of the shaped bore or of the external contour is described by means of the loci of the cam discs. The invention provides here, furthermore, the possibility of choosing between a purely radially oscillating or an eccentrically oscillating or eccentrically rotating motion superimposed on the rotational motion of the tool holder, this design band-width ranging from a relatively constant cutting speed of the cutting edge in the case of strongly fluctuating cutting angles of the trail edge to strongly fluctuating cutting speeds of the cutting edge in the case of slightly varying cutting angles of the trail edge. In this regard, the locus of a cam disc preferably describes a lead cam assigned to the cutting edge of the tool, while the two other cam discs have the complementary cams to be established. When establishing complementary cams it must be ensured that the loci do not have any inside radii smaller than the radii of the rolling members, nor any undercuts or so-called loops. Furthermore, the configuration of the loci has an effect on the smooth running or the wear of the device. Thus, instead of sharp-edged corners it will be favourable to provide gentle corner radii or to configure the lead-in and runout at the corner of a contour element with a soft transition (similar to a parabolic curve, for example) even given the use of a corner radius.

As to the number of the cam discs and the number of the rolling members rotating inside a cam disc, there is a certain degree of freedom with regard to the design of the device according to the invention. Thus, for example, it is possible for a set of cam discs to consist of four cam discs, with the possibility of selecting an equal-angular offset of the respective loci, or with the repetition of a locus (for example first and fourth cam disc with the same locus and the same angular position). It is essential for there to be at least three contact points present between the available rolling members and cam discs, or for contact lines to be present if a line contact approach is adopted. Thus, for example, it is possible to work with two cam discs, it then being the case that two rolling members rotate in one cam disc and one rolling member rotates in the other cam disc. However, it is preferable to use three cam discs having at least one rotating rolling member in each case.

The drive shaft serves to introduce the torque required for the drilling and turning, and is mounted rotatably in the housing by means of antifriction bearings. It can be configured on the machine side in such a way that the accommodation of the device is possible by means of tall standardised or commercially available systems, for example a cylindrical shaft, a Morse taper, a steep taper or front toothing, so that a form drill can be used universally on all bench and pillar drilling machines, milling machines, machining centers or turning machines with powered tools.

The housing, which remains fixed during operation, is designed, for example, either such that it can be mounted on the turret plate of a turning machine with powered tools, the connection for the coolant engaging simultaneously, or that the co-rotation of the housing is prevented by means of a separately mounted or integrated stop when then the form drill is directly connected to a rotating spindle. The housing includes the control unit, which consists of cam discs that are firmly connected to the housing and are preferably exchangeable.

Mounted in the housing is a tool holder which is connected to the drive shaft via a special coupling (for example Oldham coupling, Schmidt coupling, universal joint, helicoflex coupling, metal spiral, corrugated bellows or the like) such that a rotational force component is transmitted from the drive shaft to the tool holder, even if the tool holder is located in a radially deflected position. The tool holder is assigned elements (for example ball bearings, needle bearings, rolling sleeves, rolling members) rolling on the cam discs. On its lower end, the tool holder has either a direct receptacle for an exchangeable cutting tip or for a milling drill, or a receptacle for a tool shank. In the case of an inserted tool shank, it is possible to mount thereon an exchangeable cutting tip, preferably made from solid carbide. In the case of a design of the device to produce shaped bores, it is particularly advantageous to mount the cutting tip by means of a central bolt, which can be turned axially into the tool shank, and of axial toothing located on both parts.

Furthermore, it is provided according to the invention to provide the tool holder with a flow path for a liquid coolant, it being possible to connect this flow path in a sealable fashion to the machine-side inlet, for example by means of a co-rotating, elastomeric hose between the tool holder and drive shaft.

If, for example, the device according to the invention is to be used to produce a hexagonal contour, it follows that such a contour can be divided into six identical elements. In other words: a similar contour element is repeated after each rotation angle of 60°. If a larger corner radius is permitted for the contour, the required control unit of the form drill can be realised using a plurality of cam discs of identical contour. If, in this case, use is made, for example, of three cam discs stacked axially above one another, it is sensible to arrange the latter offset by the angular amount 60°÷3=20° with respect to one another in the direction of rotation, while the respective directions of action of the rolling members associated with the tool holder are swivelled in the selected example by in each case 360°÷3=120° with respect to one another in the corresponding axially offset planes and in a manner corresponding to the direction of rotation of the cam discs.

If such a contour is provided, for example, as a hexagonal bore for a key of 10 mm, and assuming a dimension of 10.2 mm as width across flats of the shaped bore, the result is a corner dimension of approximately 11.78 mm in the case of sharp point thinning of the corners. It follows from the corresponding radii, of 5.1 and 5.89 mm respectively, that during its revolution the cutting edge of the form drill must be moved respectively six times by 0.79 mm outwards and back again. If the mid point of a rolling member of the tool holder were to coincide with the cutting edge of the milling drill, this would result for the corresponding cam disc in a contour which essentially corresponded to a line offset outwards by the radius of the rolling member in a manner equidistant from the hexagon. In the said example, in the case of a rolling member radius of, for example, 4 mm the width across flats of the cam path would then be 18.2 mm and the corner dimension 19.78 mm. Such a design has the disadvantage that only a little space is available for the (internal) tool holder and the rolling members. On the other hand, it would be unfavourable to reverse the arrangement (cam discs inside, work holder and rolling members outside), because then the moving masses become large. The enlargement according to the invention of the cam path has the advantage here that the radial motions to be superimposed remain absolutely identical and decrease relative to the diameter of revolution, so that the tool holder rotates relatively softly. The application of this trick simultaneously creates the space required for the tool holder and permits the installation of larger rolling members.

It will be favourable in practice to offer a plurality of housing sizes, for example size 1 from 4 to 12 mm, size 2 from 10 to 25 mm, size 3 from 20 to 50 mm, for the diameter range to be covered by shaped bores or external contours. In the case of the larger contours, it is provided according to the invention that in addition to the finishing cutting edge the cutting tip or the form miller be advantageously equipped with at least one roughing cutting edge reduced in diameter and arranged with an angular twist with respect to the finishing cutting edge, in order to divide the volume to be machined and simultaneously to produce smaller chips.

Furthermore, the modular design of the form drill according to the invention is advantageous, the control units or the cam discs being exchangeable in a simple way in order to be able to use the basic device to machine both different contours and different sizes.

In the practical application as form drill of the device according to the invention, a pilot bore (tap hole) whose diameter is tuned to the smallest diameter of the shaped bore is produced conventionally. The drilling depth of the pilot bore must correspond at least to the depth of the shaped bore. The shaped boring by means of the device according to the invention is subsequently carried out in one operation using the speed matched to the diameter and a feed corresponding to the material. In this process, the feeding of coolants, preferably via internal ducts, is very important, chiefly in order to wash the bore free from chips.

When the device according to the invention is embodied as a turning device, the shank, assigned to the tool holder for the cutting tip is mounted eccentrically. There is the possibility of adjusting the shank radially. The cutting edge of the cutting tip then points inwards, in order to turn the desired external contour. In this case, just as with form drilling, it is only contours located at the end of a workpiece that can be produced.

It is proposed for the production of contours having radially strongly fluctuating dimensions, such as in the case of very large squares, for example, firstly to carry out by means of a device according to the invention a roughing operation with a reduced machining volume, a correspondingly modified set of cam discs requiring to be used. This should be followed by the finishing operation with the finished contour.

Such a machining task can be carried out using a single device in a similar way by, for example, producing a 20 mm square hole by machining with the aid of a set of cam discs for an 18 mm square hole in the central position, at first. Subsequently, the finished contour can then be produced by multiple radially offset tracing using the C axis in the case of production on the CNC turning machine.

In conjunction with the proposed detailed solutions, the device according to the invention makes available a tool which has a range of outstanding advantages:

exact contour geometry very narrow manufacturing tolerances clean bore bottom in the case of blind bores scarcely any wear of the mechanism exchangeable carbide tip high cutting speed internal coolant feeding
automatic operation on all types of machine
multiplicity of bore geometries

BRIEF DESCRIPTION OF THE DRAWINGS

The invention is explained in more detail below with the aid of an exemplary embodiment. In the drawing.

DETAILED DESCRIPTION OF THE DRAWINGS

Figure 1:
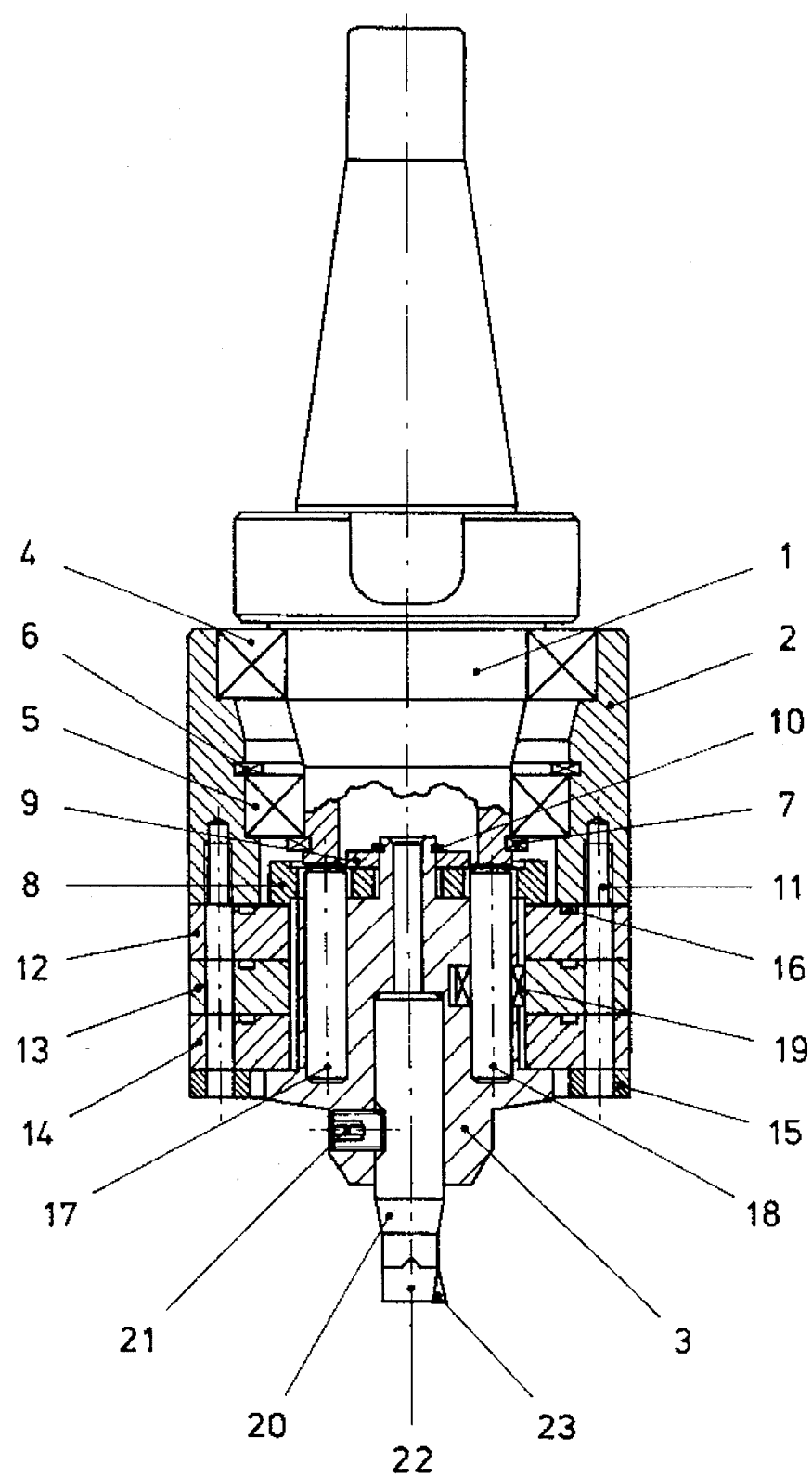
FIG. 1 shows a form drilling device according to the invention for producing relatively small shaped bores, in a slightly simplied, partially cut-away and approximately true-to-scale representation.
Figure 5:
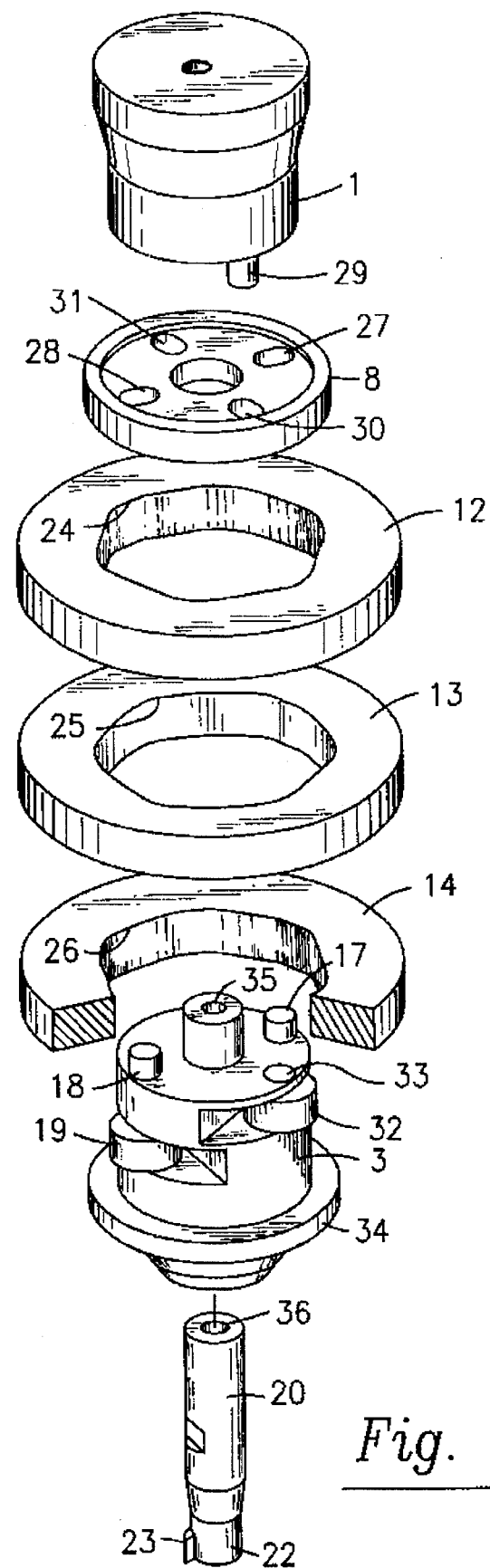
FIG. 5 shows a front elevational perspective view of the form drilling device of the invention from which the relationship between rollers and cams can be seen.
Figure 6:
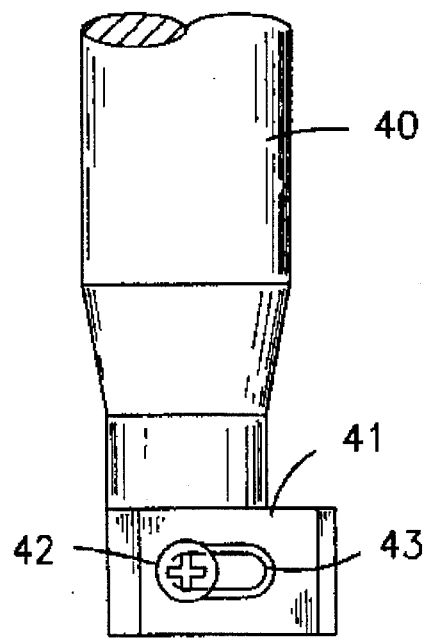
FIG. 6 shows a radially adjustable cutting tip.
Figure 7:
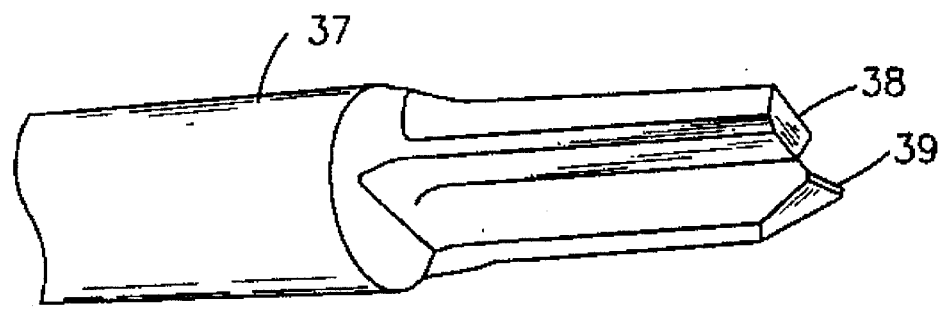
FIGS. 7, 7A show a milling drill having a rough cutting edge and a finishing cutting edge.
Figure 7A:
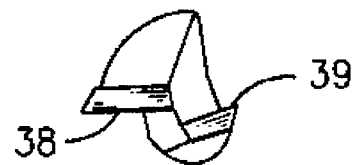

The drive shaft 1 of the device shown in FIG. 1 is designed on the machine side as a steep taper SK 30. It is mounted in the housing 2 by means of the anti-friction bearings 4, 5. The lower bearing 5 is secured by means of the retaining rings 6, 7. The drive shaft 1 is provided on the output end with journals 29 which engage in longitudinal slots 30, 31 of the coupling disc 8, but which are not visible in the representation in FIG. 1, because their position is rotated by 90° in the radial plane. The coupling disc 8 is mounted on the tool holder 3 by means of a wearing disc 9 and secured by means of a retaining ring 10. The housing 2 is assigned three cam discs 12, 13, 14 which are mounted in the blind threads 11 on the housing 2 by means of bolts (not illustrated) and are secured against rotation with respect to one another and with respect to the housing 2 with the aid of fitting pins (not illustrated). The bolts simultaneously mount a radial stop 15 on the housing 2 whose function is to prevent corotation of the housing 2. Recessed into the cam discs 12, 13, 14 are grooves 16 for O-rings which serve the purpose of sealing against the escape of oil or grease. For the sake of simplicity, the internal contour of the cam discs has been drawn uniformly smooth, that is to say no account has been taken of the respective offset produced by the contour and the rotational angle. The tool holder 3 engages by means of two fitting pins 17, 18 which are located opposite one another at 180° in the longitudinal slots 27, 28 of the coupling disc 8. One of the fitting pins 18 simultaneously serves as journal for the rolling member 19, which corresponds to the central cam disc 13. Not represented in FIG. 1, or covered therein, are two further fitting pins, which have rolling members that are arranged rotated by 120° with respect to the fitting pin 18 in the radial plane of the tool holder in each case, and whose rolling members correspond to the cam discs 12 and 14. FIG. 5 shows fitting pin 33 and rolling member 32 arranged 120° from fitting pin 18 and rolling member 19. The tool holder is mounted by means of a collar 34 on the end face of the lowermost cam disc 14, in order thus to lead away the axial forces occurring during drilling. It is possible to integrate a face seal ring or a ball rim, at the same site, in order to minimise the friction that occurs. It is also possible to take up the axial forces in the case of a corresponding design (width) of the rolling members 19, 32, and the cam discs 12, 13, 14 by inserting thin plates between the cam discs which project slightly beyond the internal circumference of the cam discs. In this case, the rolling members 19, for example ball bearings, then run on these plates on their outermost rim region. It is then possible to eliminate the support on the collar of the tool holder. A tool shank 20 is inserted into the tool holder and tightened with the aid of a grub screw 21. An exchangeable cutting tip 22 made from carbide is screwed onto the tool shank 20. The cutting tip 22 is equipped with a cutting edge 23 whose angular position on the tool holder corresponds to the rolling member 19 and the cam disc 13. The tool holder 3 is bored through centrally 35 (FIG. 5) in order to open up a duct for the coolant. The extension of the bore inside the tool holder and the outlet in the vicinity of the cutting tip have been omitted from FIG.1 for reasons of simplification in the same way as the connection leading further upwards internally.

Figure 2:
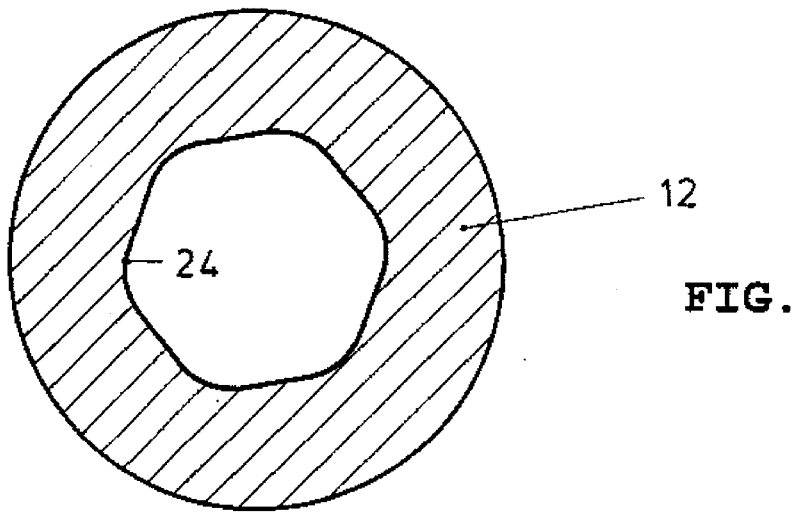
FIGS. 2, 3 and 4 show in each case a disc of a set of cam discs for the form drilling device represented in FIG. 1.
Figure 3:
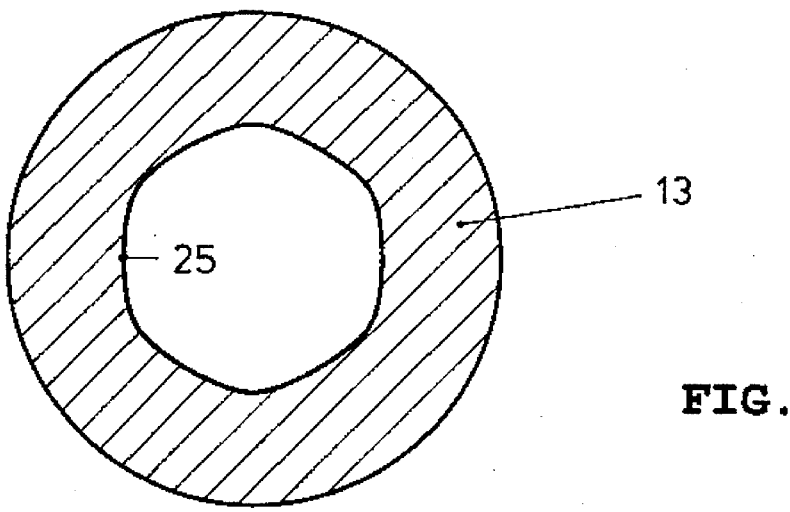
Figure 4:
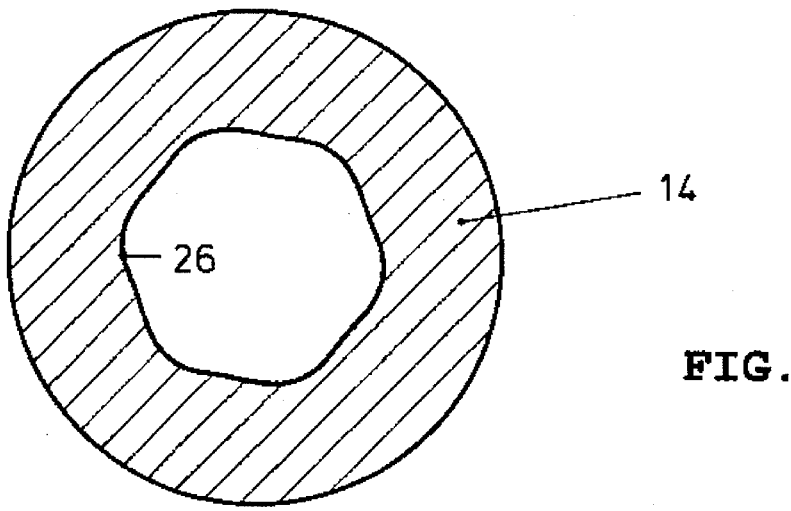

Represented in section to the same scale in the radial plane in FIGS. 2, 3 and 4 are the three individual cam discs 12, 13, 14 of the set of cam discs that is associated with the exemplary embodiment shown in FIG. 1. For the purpose of simplifying the drawing, the fitting bores for the fitting pins have been omitted, as have the through bores for the mounting screws. The set of cam discs shown is provided for producing a socket hexagon with a width across flats of 11 mm. The individual cam discs are open at their center, the walls of these openings being formed with the configuration of a respective locus 24, 25, 26. The central cam disc 13, which corresponds in the exemplary embodiment to that rolling member which is assigned to the cutting edge 23 of the cutting tip 22 has the lead cam 25. The upper and lower cam discs are provided respectively with the complementary cams 24, 26. It is clearly to be seen that owing to the enlarged contour and the formation of the equidistant lines the lead cam thus formed in the selected design is already very nearly circular in shape. Nevertheless, the hexagonal basic shape is still indicated. It may also clearly be seen that the two complementary cams 24, 26 have loci which depart from the lead cam 25. Although all the loci have a soft and rounded characteristic in common, during revolution of the tool cutting edge 23 a perfect and sharp-edged contour is actually described.

The tool holder may be constructed to accommodate a milling drill. The milling drill may be provided with a finishing cutting edge and at least one roughing cutting edge which is radially reduced and arranged with an angular twist with respect to the finishing cutting edge.

I claim:

1. A form drilling device for drilling a contoured form, said device consisting of:

a drive shaft;

a fixed housing; and a tool holder for holding a tool having at least one cutting edge;

said drive shaft and tool holder being mounted rotatably in said housing and connected to one another such that during operation a rotational force component is transmitted from the drive shaft onto the tool holder, said tool holder mounted so as to be capable of being deflected in a radial plane, this deflection being controllable for the purpose of contour production by means of control elements assigned to the housing and the tool holder, said control elements consisting of at least two cam disks firmly connected to said housing, one of which is a lead cam, said disks arranged one above the other and mounted with rotation of orientation with respect to one another by an angular amount in the direction of rotation, said control elements further comprising rolling members which roll on said at least two cam disks, the rolling members being operatively associated with the tool holder, there being at least three contact points present between the rolling members said at least two and cam disks, wherein a control contour of the lead cam is derived by (i) adding a fixed distance to the contour of the drilled form to be produced, said distance being added in a direction radially outward from a center of the contour of the drilled form to be produced, to obtain a distorted contours having an outer surface, and (ii) projecting outwardly from the distorted contour produced in step (i) a distance equal to one half of the diameter of the rolling member which is to be in contact with said cam, said distance being added in a direction perpendicular to the outer surface of the distorted contour produced in step (i).

2. A device as in claim 1, wherein said tool holder is constructed to accommodate a milling drill.

3. A device as in claim 1, wherein said milling drill is provided with a finishing cutting edge and at least one roughing cutting edge which is radially reduced and arranged with an angular twist with respect to the finishing cutting edge.

4. A device as in claim 1, wherein said tool holder is constructed to accommodate a tool shank adapted for receiving an exchangeable cutting tip mountable on said tool shank.

5. A device as in claim 4, wherein said tool shank is provided with a finishing cutting edge and at least one roughing cutting edge which is radially reduced and arranged with an angular twist with respect to the finishing cutting edge.

6. A device as in claim 1, wherein said cutting tip is radially adjustable.

7. A device as in claim 1, said tool holder being provided with a flow path for liquid coolant, said flow path being sealingly connected to an inlet on the machine side of said device.

8. A device as in claim 1, wherein said tool holder is connected to the drive shaft via a coupling in order to transmit a rotational force component from the drive shaft to the tool holder, despite respective deflection in the radial plane.

9. A device as in claim 8, wherein said coupling is an Oldham coupling.

10. A device as in claim 8, wherein said coupling is an Oldham coupling consisting of a disc which has two groups of longitudinal holes each of which extends radially and which are diametrically opposite one another, the groups being arranged offset at a right angle with respect to one another.

* * * * *